United States Patent Office 2,704,289
Patented Mar. 15, 1955

2,704,289

NEW CLASS OF CHLORO-PHTHALIDES AND METHODS OF PREPARING THE SAME

Brian L. Hutchings, Pearl River, Samuel Gordon, Orangeburg, and Carl F. Wolf, Spring Valley, N. Y., assignors to American Cyanamid Company, New York, N. Y., a corporation of Maine No Drawing. Application May 3, 1952,
Serial No. 286,025

13 Claims. (Cl. 260—343.3)

This invention relates to a new class of phthalide compounds and methods of making the same. More particularly this invention relates to certain new dicarboxylic acids containing a phthalide nucleus, and their patentable equivalents, for instance the simple esters, and anhydrides thereof.

The new dicarboxylic acids of this invention can be represented by the following formula:

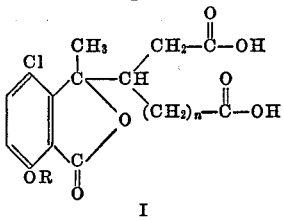

I in which R represents hydrogen or a lower alkyl radical, for instance methyl, ethyl or propyl; and $n$ represents an integer from 0 to 1 inclusive. Since the new acids contain two carboxyl groups, they form esters in a manner typical of dicarboxylic acids and can be isolated either as the mono-ester or the di-ester. For instance, the new compounds can be isolated in the form of their monomethyl or mono-benzyl ester, or they can be isolated in the form of their dimethyl or dibenzyl esters. Of course, the new acids undergo other typical reactions of carboxylic acids and can, for instance be prepared and isolated in the form of metal salts or salts with organic bases. The new dicarboxylic acids can also be readily converted to acid chlorides or amides by the usual procedures for preparing acid chlorides and amides well known to those skilled in the art.

As will be seen from the above formula, the new dicarboxylic acids of this invention have 2 carboxyl groups separated by a chain of either 2 or 3 carbon atoms. Typical of such dicarboxylic acids, the new acids of this invention are capable of forming cyclic anhydrides and, indeed, these new anhydrides have been found to be very useful. For instance, when "n" in the above formula represents "1," the dibasic acids from cyclic anhydrides which can be represented by the following structural formula:

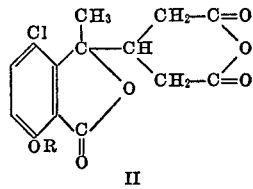

II and when "n" in Formula I above represents "0," the new dibasic acids form cyclic anhydrides which can be represented by the following formula:

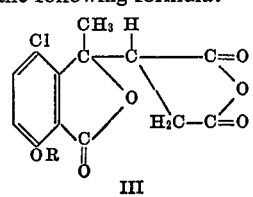

III in which R is as previously defined.

The new compounds of this invention are stable crystalline solids and are useful in many fields of organic chemistry. For instance, the new compounds, when in the form of the free acids or cyclic anhydrides, are useful as resin intermediates and can be reacted with a polyhydric alcohol, such as glycerin, to form polyester resins. Many of the new compounds also show antiseptic properties and may be employed in compositions prepared for antiseptic use.

While it is not intended that this invention be limited to new compounds of the above description when prepared by any one particular procedure, a method of preparing the new class of compounds has been discovered and it is intended that this new method also constitute a part of the present invention. The new method of this invention comprises treating an alkylated aureomycin with a strong oxidizing agent at a neutral or alkaline hydrogen ion concentration and in the presence of an inert solvent at a temperature of from about room temperature to the reflux temperature of the reaction mixture.

Aureomycin is a well known material produced by the fermentation of streptomyces aureofaciens in an appropriate culture medium, and is at present widely employed as an antibiotic and as an animal food supplement. Aureomycin is a single chemical entity having an acidic hydroxy group which can be readily alkylated by the usual methods of alkylating acidic hydroxy groups well known to those skilled in the art. For instance, the hydroxy group in aureomycin can be conveniently alkylated by heating aureomycin with an alkyl sulfate in aqueous solution. Detailed procedures for this alkylation step are set forth in the examples to follow. Aureomycin having its free acidic hydroxy group transformed to an alkoxy group constitutes the starting material for the new process of this invention and is referred to in this specification and claims simply as "alkylated aureomycin." It should also be pointed out that under certain circumstances aureomycin undergoes a rearrangement whereby a free carboxyl group is liberated. Such a rearrangement can be deliberately brought about by heating aureomycin with zinc dust in a strong alkaline aqueous solution. Of course, if rearranged aureomycin is alkylated subsequent to rearrangement, it results in the esterification of the liberated carboxyl group; however, this does not destroy its usefulness as a starting material for the new process of this invention. In other words, alkylated aureomycin, whether alkylated in its normal or rearranged form, is suitable for the preparation of the new compounds of this invention.

The new reaction of this invention is preferably performed in aqueous solution although other inert solvents can be employed in place of, or in addition to, an aqueous solvent. For instance, one can employ acetone, dioxane, or tetrahydrofuran as the only solvent, or in combination with an aqueous solvent. Since, however, the strong oxidizing agents are usually more satisfactorily employed in aqueous solution, the use of organic solvents is not ordinarily advantageous.

Any of the common strong oxidizing agents may be employed in the new process of this invention. The preferred strong oxidizing agent is potassium permanganate, since it is readily available and since it results in a very convenient method of operation. However, other strong oxidizing agents, for instance potassium dichromate, also give satisfactory results in most instances. The strong oxidizing agent should be employed in at least stoichiometrical quantities and preferably in a large excess of the calculated amount. When potassium permanganate is employed as the oxidizing agent, the presence of an excess is readily apparent from the purple color of the solution.

It is an advantage of the new process that the new reaction can be performed at widely varying hydrogen ion concentrations. For instance, the reaction can be satisfactorily performed at hydrogen ion concentrations from about neutral up to and including the pH of concentrated sodium hydroxide, or in other words, at pHs of about pH 7 or above, although the reaction is preferably performed at a pH having a numerical value of 10 or more since greater yields are usually obtained in highly basic solution. The reaction mixture can be made basic by the addition of a strong base, for instance sodium hydroxide or potassium hydroxide, although this is usually not necessary since the reaction mixture naturally becomes basic of its own accord as the reaction progresses.

It is also an advantage of the new process of this invention that it may be performed within a very wide temperature range, and in fact temperatures of from about 0° C. up to the reflux temperature of the reaction mixture are satisfactory. Since, however, some decomposition apparently takes place at temperatures above about 90° C., the reaction mixture should preferably be maintained below this temperature by cooling. On the other hand, to maintain temperatures below about 15° C. necessitates a very large amount of cooling and, therefore, temperatures from about 15° C. to 90° C. constitute a preferred range. As stated above, the reaction is strongly exothermic and since the reaction is accelerated by higher temperatures, some difficulty may be encountered in maintaining the temperature within the preferred range if one allows the temperature to approach the upper limit of the preferred range during the first one or two hours of the reaction. Therefore, it is usually advantageous to maintain the temperature during the first hours of the reaction at below about 40° C., after which time it can be allowed to rise to the upper part of the preferred range without undue danger of becoming uncontrollable. It should also be mentioned that the reaction is more vigorous at highly alkaline hydrogen ion concentrations, and therefore if the reaction is being performed at an alkaline pH, additional care should be exercised to maintain the temperature at a low level during the first one or two hours of reaction. In fact, in alkaline oxidation, it will usually be found to be advantageous to maintain the temperature below about 20° C. or 30° C. during the first one or two hours of reaction.

Since the reaction is exothermic, the completion of the reaction is readily determined. In other words, the reaction is relatively complete when the temperature of the reaction mixture no longer tends to rise. Since, however, there is practically no danger of decomposing the reaction products, it is usually advantageous to allow the reaction to continue at room temperature for several hours after the reaction ceases to be noticeably exothermic. For instance, it has been found that slightly better yields are obtained if the reaction mixture containing an excess of permanganate is allowed to sit overnight at room temperature.

The invention will be more particularly illustrated by the following specific examples in which all parts are by weight unless otherwise indicated.

EXAMPLE I

*Monomethyl ester of beta-(3-methyl-4-chloro-7-methoxyphthalidyl)glutaric acid*

Twenty grams of aureomycin were mixed in dry state with an equal weight of zinc dust; to this mixture was added 250 ml. of 5 N NaOH. The solution was then covered with toluene and heated on the steambath for two hours. Periodically a small amount of zinc was added to the reaction mixture. At the end of the heating period the zinc was filtered off and the aqueous phase was separated from the toluene. Acidification of the aqueous phase caused separation of a gum which was removed. The filtrate was heated, treated with activated carbon (Norit), filtered hot, and then chilled. On standing, four grams of crude zinc-alkali rearranged product precipitated. Repeated recrystallizations from water-HCl yielded about 2.4 g. of pure zinc-alkali rearranged aureomycin.

One gram of the zinc-5 N NaOH rearranged aureomycin was dissolved in 50 cc. methanol and an excess of diazomethane in ether added. After one hour the solution was evaporated to dryness. The colored solid residue was dissolved in methanol-HCl and decolorized with activated carbon (Norit). The product was obtained by adding ethyl ether and then cooling in a Dry Ice-acetone bath. The precipitate was quickly centrifuged and dried in vacuum to yield about 0.5 g. of a crude product. This was recrystallized from 0.1 N HCl to yield approximately 300 mgs. of crystalline product melting at about 155° C.–158° C.

One gram of methylated zinc-alkali rearranged product was dissolved in 25 cc. of water containing 0.5 g. of $MgSO_4$. Seventy cc. of a saturated $KMnO_4$ solution was added and the mixture was allowed to stand at room temperature for three hours. The excess $KMnO_4$ was destroyed with $NaHSO_3$ and the mixture was filtered. The water clear filtrate was extracted with ethyl acetate, then acidified (pH 2–3) and again extracted with ethyl acetate. The methyl acetate phase was dried by freezing and then evaporated to dryness yielding approximately 300 mgs. of non-crystalline material. This product was redissolved in 25 cc. of ethyl acetate and extracted into pH 7 (1 M) phosphate buffer. The aqueous buffer solution was acidified (pH 2–3) and extracted with ethyl acetate. The ethyl acetate was dried and evaporated to an oily solid. This residue was extracted with boiling ethyl ether. To the ether solution was added petroleum ether (30° C.–50° C.) and the solution was allowed to stand overnight. The resulting precipitate of the monomethyl ester of beta-(3-methyl-4-chloro-7-methoxyphthalidyl)glutaric acid was recovered by filtration and purified by recrystallization several times from benzene and finally from ether-petroleum ether.

EXAMPLE II

*Beta-(3-methyl-4-chloro-7-methoxyphthalidyl)glutaric acid*

METHOD I

Two hundred grams of aureomycin in a solution of 750 g. of sodium carbonate and 5 l. of water were methylated with 1,350 ml. of methyl sulfate at 55° C.–65° C. over a period of 2½–3 hours. The mixture was cooled with ice to 25° C., 500 ml. of 10 N NaOH were added and then the mixture was oxidized by adding solid $KMnO_4$ until an excess of permanganate was present. During the oxidation the temperature was kept between 25° C.–30° C. by the addition of ice to the mixture. After 3–4 hours at 25° C.–30° C. the temperature of the reaction mixture was allowed to go up to 45° C.–50° C. for an additional 2 hours. The oxidation mixture was then stirred overnight at room temperature with excess $KMnO_4$. By morning the excess permanganate had been reduced, therefore, additional permanganate was added and the mixture heated for about an hour. When no permanganate remained, the mixture was acidified to pH 1 with 50% $H_2SO_4$. Much foaming occurred during this acidification. The pH was then brought to 10 with 40% NaOH solution and the $MnO_2$ was removed by filtration. The resulting deep amber solution, 16 l., was acidified to pH 1 with sulfuric acid, and was then extracted with 5 portions of ethyl acetate, totaling 13 l. The ethyl acetate extracts were combined and concentrated to 3–4 l. The ethyl acetate solution was then extracted with about 2 l. of pH 7 phosphate buffer (1 M). On acidification of the buffer phase to pH 1 with concentrated HCl, an oil separated and was removed. The aqueous phase was then extracted with three equal volumes of ethyl acetate and this extract was concentrated to dryness yielding an oily residue. The oily residue and the oil from above were combined, dissolved in ethyl acetate and concentrated to effect crystallization. About 61 g. of crude solid were obtained. This material was fractionally crystallized from ethyl acetate yielding about 45.7 g. of beta -(3-methyl-4-chloro-7-methoxyphthalidyl)-glutaric acid which was purified by successive recrystallizations and fractionations from ethyl acetate and water.

EXAMPLE III

*Beta-(3-methyl-4-chloro-7-methoxyphthalidyl)glutaric acid*

METHOD II

Twenty grams of aureomycin were methylated according to the procedure outlined in Example II. After methylation, 20 g. of magnesium sulfate were added to the reaction mixture and excess permanganate was added over a period of 5 hours. Ice was added during the first part of the reaction to maintain the temperature at 70 C.–80° C. When the temperature no longer increased spontaneously (after about one hour), the mixture was maintained at 60° C.–65° C. by heating on the steambath. Then the reaction was left at room temperature overnight. The following day the excess $KMnO_4$ was decomposed with $NaHSO_3$ and the mixture acidified to pH 1 with concentrated HCl. The acidified mixture was then extracted with three volumes of ethyl acetate and the ethyl acetate extract discarded. The aqueous mother liquor was then re-extracted with several volumes of ethyl acetate. The ethyl acetate phase from the second extraction was concentrated to dryness and the residue dissolved in fresh ethyl acetate. To this solution there was added a small quantity of high boiling petroleum ether which resulted in the precipitation of an impurity. The impurity was removed by filtration and the ethyl acetate-petroleum ether filtrate was concentrated to dryness. The resulting residue was recrystallized from ethyl acetate and the recrystallized material was then dissolved in hot water, extracted several times with ethyl acetate and precipitated from the latter by the addition of petroleum ether. This beta-(3-methyl-4- chloro - 7 - methoxyphthalidyl)glutaric acid was then further purified by recrystallization from ethyl acetate-petroleum ether.

EXAMPLE IV

*Beta-(3-methyl-4-chloro-7-methoxyphthalidyl)glutaric acid*

METHOD III

Two hundred bgs. of the monomethyl ester of beta-(3-methyl-4-chloro-7-methoxyphthalidyl)glutaric a c i d (prepared by the method of Example I) were dissolved in 10 ml. of 2 N HCl and refluxed for 4 hours. The solution was placed at 4° C. for 16 hours and the crystals collected and dried. A yield of about 175 mgs. of beta-(3-methyl-4-chloro-7-methoxyphthalidyl)glutaric acid was obtained.

EXAMPLE V

*(3-methyl-4-chloro-7-methoxyphthalidyl)succinic acid*

Twenty grams of aureomycin hydrochloride was suspended in 100 ml. of water containing excess sodium carbonate. One hundred and fifteen milliliters of methyl sulfate was added gradually over a one hour period and the reaction was run at 70° C.–80° C. in the presence of excess sodium carbonate. The solution was cooled to room temperature, excess magnesium sulfate was added and then solid potassium permanganate was gradually added with ice to keep the temperature at 80° C. After one hour the most vigorous part of the oxidation was over. The solution was then heated on the steambath for three hours in the presence of excess potassium permanganate. After destroying the excess permanganate with NaHSO₃, the solution was filtered, acidified to pH 1 with conc. HCl, and extracted twice with equal volumes of ethyl acetate. The combined ethyl acetate extracts were extracted with 200 ml. of pH 7 phosphate buffer (1 M). The pH 7 buffer was then acidified to pH 1 with conc. HCl and re-extracted twice with equal volumes of ethyl acetate. The ethyl acetate phase was concentrated to dryness, and the residue taken up in warm water. On cooling a solid and an oil were obtained. The oil was separated by filtration, and re-oxidized with permanganate and magnesium sulfate for four hours as described above. After the excess permanganate was destroyed with sodium bisulfite, the solution was acidified to pH 1 with HCl and extracted with several volumes of ethyl acetate. The ethyl acetate phase was concentrated to dryness. The residue of (3-methyl-4-chloro-7-methoxyphthalidyl)succinic acid was crystallized twice from ethyl acetate-petroleum ether and twice from water.

EXAMPLE VI

*(3-methyl-4-chloro - 7 - methoxyphthalidyl)succinic anhydride*

About 500 mgs. of (3-methyl-4-chloro-7-methoxyphthalidyl)succinic acid was dissolved in 10 ml. of acetic anhydride and heated for 2.5 hours on the steam bath. The solution was then concentrated in vacuo and the residue crystallized from benzene-petroleum ether.

EXAMPLE VII

*Anhydride of beta-(3-methyl-4-chloro-7-methoxyphthalidyl)glutaric acid*

About 500 mgs. of beta-(3-methyl-4-chloro-7-methoxyphthalidyl)glutaric acid was refluxed with 10 ml. of acetic anhydride for three hours. Most of the acetic anhydride was evaporated off and the residue was recrystallized from benzene-petroleum ether, yielding the crystalline anhydride.

EXAMPLE VIII

*Dimethyl beta-(3-methyl-4-chloro-7-methoxyphthalidyl)- glutarate*

One hundred milligrams of beta-(3-methyl-4-chloro-7-methoxyphthalidyl)glutaric acid were dissolved in 5 ml. of methanol containing three drops of concentrated sulfuric acid. The solution was refluxed for fifteen minutes, let stand overnight at room temperature, and then was refluxed an additional two hours. The solution was cooled, concentrated to half volume, and 20 ml. of pH 7 phosphate buffer (1 M) were added. The ester precipitated from this solution and was extracted into an equal volume of ethyl acetate. The ethyl acetate solution was dried and concentrated to dryness. The residue was crystallized from ether-petroleum ether, yielding about 100 mgs. of dimethyl beta-(3-methyl-4-chloro-7-methoxyphthalidyl)glutarate.

EXAMPLE IX

*Beta-(3 - methyl - 4 - chloro-7-hydroxyphthalidyl)glutaric acid*

One gram of beta-(3-methyl-4-chloro-7-methoxyphthalidyl)glutaric acid was refluxed for three hours with 50 ml. of 48% hydrobromic acid, diluted with an equal volume of water and then extracted three times with equal volumes of ethyl acetate. The resulting beta-(3-methyl-4-chloro-7-hydroxyphthalidyl)glutaric acid is purified by recrystallization from ethyl acetate-benzene.

EXAMPLE X

*Dimethyl beta-(3-methyl-4-chloro-7-hydroxyphthalidyl)- glutarate*

Beta-(3 - methyl-4-chloro-7-hydroxyphthalidyl)glutaric acid, 420 mgs., was dissolved in 15 ml. of MeOH. Three drops of concentrated H₂SO₄ was added, the solution was refluxed 3 hours and then allowed to stand overnight at room temperature. The solution was concentrated to a small volume and then 15 ml. of pH 7.0 phosphate buffer (1 M) was added. The ester precipitated, and was extracted into ethyl acetate. It was purified by two recrystallizations from ether-petroleum ether.

We claim:
1. Compounds selected from the group consisting of the dicarboxylic acids represented by the formula:

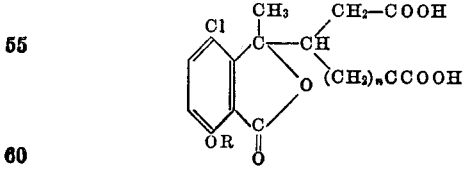

where R represents a member selected from the group consisting of hydrogen and lower alkyl radicals, and n represents an integer from 0 to 1 inclusive; the mono- and di-(lower) alkyl and aralkyl esters and cyclic anhydrides of said dicarboxylic acids.
2. The beta-[3-methyl - 4 - chloro - 7 - (lower alkoxy)-phthalidyl]glutaric acids.
3. The new compound beta-(3-methyl - 4 - chloro-7-methoxyphthalidyl)glutaric acid.
4. The beta-[3-methyl - 4 - chloro - 7 - (lower alkoxy)-phthalidyl]glutaric anhydrides.
5. The new compound beta-(3-methyl-4-chloro-7-methoxyphthalidyl)glutaric anhydride.
6. The [3-methyl-4-chloro-7-(lower alkoxy)phthalidyl]succinic acids.
7. The new compound (3-methyl-4-chloro-7-methoxyphthalidyl)succinic acid.
8. The [3-methyl-4-chloro-7-(lower alkoxyphthalidyl]-succinic anhydrides.
9. The new compound (3-methyl-4-chloro-7-methoxyphthalidyl)succinic anhydride.
10. The new compound beta-(3-methyl-4-chloro-7-hydroxyphthalidyl)glutaric acid.
11. The method of preparing compounds selected from the group consisting of the dicarboxylic acids represented by the formula:

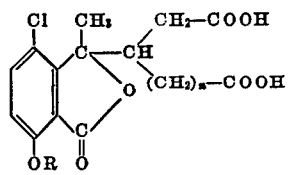

where R represents a member selected from the group consisting of hydrogen and lower alkyl radicals, and $n$ represents an integer from 0 to 1 inclusive; the mono- and di- (lower) alkyl and aralkyl esters and cyclic anhydrides of said dicarboxylic acids, which comprises treating an alkylated aureomycin in an inert solvent with a strong oxidizing agent at a temperature of from about 15° C. to 90° C., and maintaining the hydrogen ion concentration of the reaction mixture at a pH of a numerical value of at least about seven.

12. The method of claim 11 where said inert solvent is an aqueous solvent and said strong oxidizing agent is potassium permanganate.

13. The method of claim 12 where the hydrogen ion concentration of the reaction mixture is maintained throughout substantially the entire oxidation at a pH of a numerical value of at least ten.

No references cited.